(12) United States Patent
Wang et al.

(10) Patent No.: US 7,947,145 B2
(45) Date of Patent: May 24, 2011

(54) METHOD FOR MAKING CARBON NANOTUBE COMPOSITE

(75) Inventors: Jia-Ping Wang, Beijing (CN); Qun-Feng Cheng, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 327 days.

(21) Appl. No.: 12/246,356

(22) Filed: Oct. 6, 2008

(65) Prior Publication Data

US 2009/0159198 A1   Jun. 25, 2009

(30) Foreign Application Priority Data

Dec. 21, 2007   (CN) .......................... 2007 1 0125411

(51) Int. Cl.
*B32B 38/10* (2006.01)
(52) U.S. Cl. ....................................... 156/281; 977/882
(58) Field of Classification Search .................. 156/281; 977/882
See application file for complete search history.

(56) References Cited

U.S. PATENT DOCUMENTS

| | | | |
|---|---|---|---|
| 7,704,480 B2 | 4/2010 | Jiang et al. | |
| 7,799,163 B1* | 9/2010 | Mau et al. | 156/247 |
| 2003/0039816 A1 | 2/2003 | Wang et al. | |
| 2003/0122111 A1* | 7/2003 | Glatkowski | 252/500 |
| 2009/0096346 A1 | 4/2009 | Liu et al. | |
| 2009/0117434 A1 | 5/2009 | Liu et al. | |
| 2009/0153506 A1 | 6/2009 | Liu et al. | |
| 2009/0153513 A1 | 6/2009 | Liu et al. | |
| 2009/0159188 A1 | 6/2009 | Jiang et al. | |
| 2009/0160799 A1 | 6/2009 | Jiang et al. | |

FOREIGN PATENT DOCUMENTS

| | | |
|---|---|---|
| CN | 1699452 | 11/2005 |
| CN | 1982209 | 6/2007 |
| EP | 2037516AI | 3/2009 |
| EP | 2061077 A2 | 5/2009 |
| JP | 2004526838 | 9/2004 |
| JP | 2004538353 | 12/2004 |
| JP | 2005255985 | 9/2005 |
| JP | 2009091239 | 4/2009 |
| JP | 2009117354 | 5/2009 |
| JP | 2009146424 | 7/2009 |
| JP | 2009151781 | 7/2009 |
| JP | 2009163729 | 7/2009 |
| JP | 20091517823 | 7/2009 |
| WO | WO0073204 | 12/2000 |
| WO | WO0276724 A1 | 3/2002 |

OTHER PUBLICATIONS

Zhang, Mei et al., Strong, Transparent, Multifunctional, Carbon Nanotube Sheets, as supplied by Applicant.* "Strong, Transparent,Multifunctional, Carbon Nanotube Sheets",Mei Zhang et al,Science, American Association for the Advancement of Science, Washington, DC; US LNKD- DOI:I0.1126/Science.1115311,vol. 309, Aug. 19, 2005.

* cited by examiner

*Primary Examiner* — Kat Wyrozebski
*Assistant Examiner* — Daniel Lee
(74) *Attorney, Agent, or Firm* — D. Austin Bonderer (57) ABSTRACT

A method for making a carbon nanotube composite includes: (a) providing at least one carbon nanotube film and at least one polymer film; (b) forming a carbon nanotube film structure with the carbon nanotube film on a surface of the polymer film to obtain a carbon nanotube composite preform; (c) pre-combining the carbon nanotube composite preform to obtain a treated carbon nanotube composite preform; and (d) heating and pressing at least one treated carbon nanotube composite preform to achieve a carbon nanotube composite.

20 Claims, 6 Drawing Sheets providing at least one carbon nanotube film and at least one polymer film

↓ forming a carbon nanotube film structure with the carbon nanotube films on a surface of the polymer film to obtain a first carbon nanotube composite preform

↓ pre-combining the first carbon nanotube composite preform to obtain a second carbon nanotube composite preform

↓ heating and pressing at least one second carbon nanotube composite preform to achieve a carbon nanotube composite

METHOD FOR MAKING CARBON NANOTUBE COMPOSITE

RELATED APPLICATIONS

This application is related to commonly-assigned application Ser. Nos. 12/246,353 and 12/246,340 entitled, "METHOD FOR MAKING CARBON NANOTUBE BASED COMPOSITE", Oct. 6, 2008 and "CARBON-NANOTUBE-BASED COMPOSITE MATERIAL AND METHOD FOR MAKING THE SAME", Oct. 6, 2008. The disclosures of the above-identified applications are incorporated herein by reference.

BACKGROUND

1. Field of the Invention

The present invention relates to methods for making composites and, particularly, to a method for making a carbon nanotube composite.

2. Discussion of Related Art

Carbon nanotubes (CNTs) are novel carbonaceous materials and have received a great deal of interest since the early 1990s. Carbon nanotubes have interesting and potentially useful heat conductive, electrical, and mechanical properties. Due to these and other properties, it becomes an important application direction for CNTs to be used as fillers in composite materials.

A conventional method for making a carbon nanotube composite includes the following steps of: (a) functionalizing the carbon nanotubes; (b) dispersing the functionalized carbon nanotubes into a thermoplastic polymer solution to obtain a mixture; (c) spraying or dipping the mixture on a substrate to form a layer; and (d) volatilizing the solvent in the layer to achieve a carbon nanotube composite.

However, some drawbacks arise from the conventional method for making carbon nanotube composite. Firstly, it is difficult to uniformly disperse the carbon nanotubes into thermoplastic polymer solution. Secondly, the process of functionalizing the carbon nanotubes will damage the integrity of the carbon nanotubes. Thirdly, the carbon nanotubes distribute in the polymer disorderly.

What is needed, therefore, is a method for making carbon nanotube composite that can orderly distribute the carbon nanotubes into the polymer matrix.

BRIEF DESCRIPTION OF THE DRAWINGS

Many aspects of the present method for making a carbon nanotube composite can be better understood with references to the following drawings. The components in the drawings are not necessarily drawn to scale, the emphasis instead being placed upon clearly illustrating the principles of the present method for making the carbon nanotube composite.

Corresponding reference characters indicate corresponding parts throughout the several views. The exemplifications set out herein illustrate at least one embodiment of the method for making the carbon nanotube composite, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the method for making the carbon nanotube composite.

Figure 1:
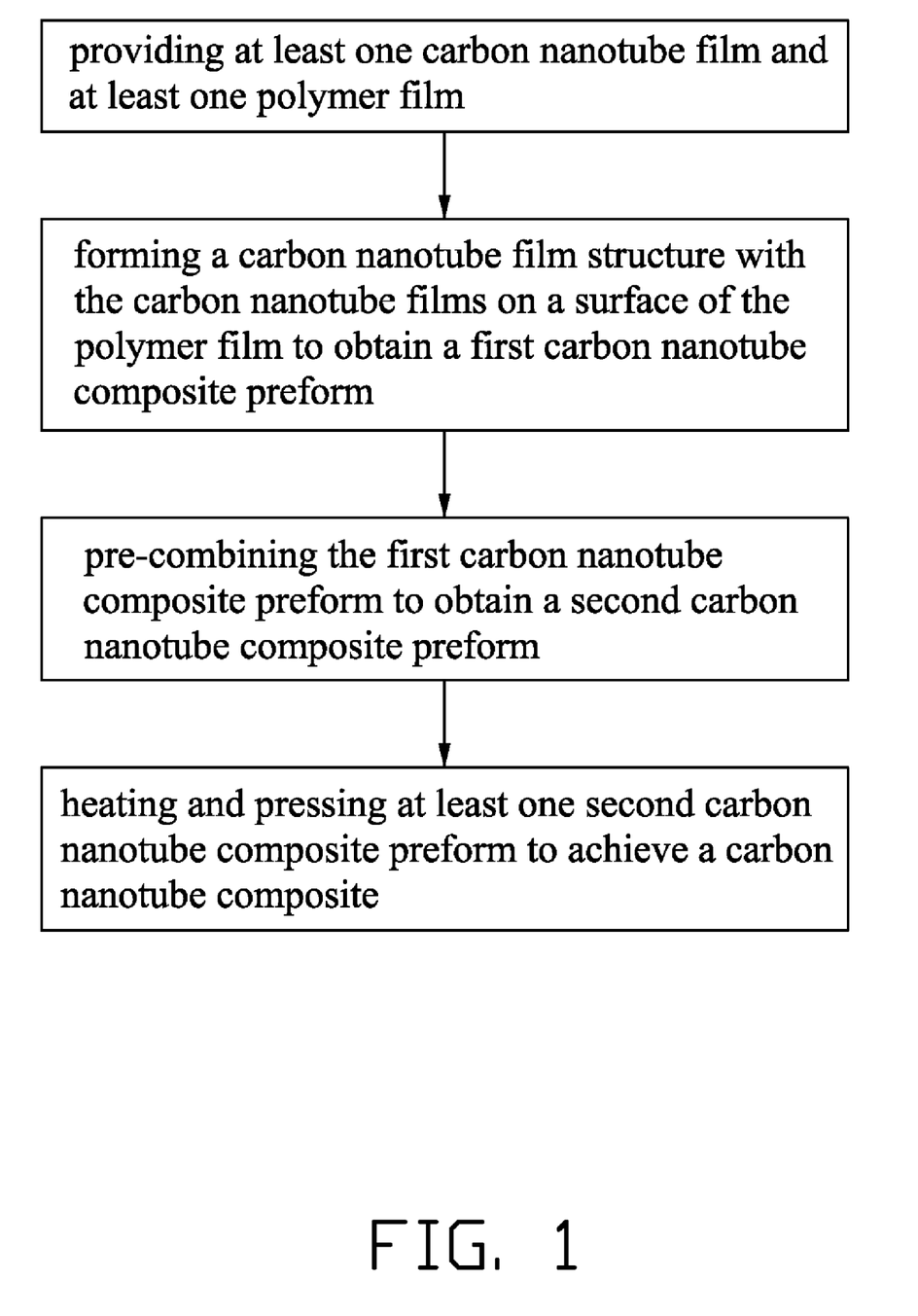
FIG. 1 is a flow chart of a method for making a carbon nanotube composite in accordance with the present embodiment.

Referring to FIG. 1, a method for making a carbon nanotube composite includes the following steps of: (a) providing at least one carbon nanotube film and at least one polymer film; (b) forming a carbon nanotube film structure with the carbon nanotube films on a surface of the polymer film to obtain a carbon nanotube composite preform; (c) pre-combining the carbon nanotube composite preform to obtain a treated carbon nanotube composite preform; and (d) heating and pressing at least one treated carbon nanotube composite preform to achieve a carbon nanotube composite.

The step (a) includes a step of (e) fabricating at least one carbon nanotube film. The step (e) includes the following substeps of: (e1) providing a substrate with a super-aligned array of carbon nanotubes formed thereon; (e2) selecting a plurality of carbon nanotubes ("carbon nanotube segments") having a predetermined width from the super-aligned array of carbon nanotubes; and (e3) pulling out a carbon nanotube film from the array of carbon nanotubes via a pulling tool (e.g., adhesive tape or another tool allowing multiple carbon nanotubes to be gripped and pulled simultaneously), and achieving a carbon nanotube film.

In step (e1), a given super-aligned array of carbon nanotubes can be formed by the substeps of: (e11) providing a substantially flat and smooth substrate; (e12) forming a catalyst layer on the substrate; (e13) annealing the substrate with the catalyst layer in air at a temperature approximately ranging from 700° C. to 900° C. for about 30 to 90 minutes; (e14) heating the substrate with the catalyst layer to a temperature approximately ranging from 500° C. to 740° C. in a furnace with a protective gas therein; and (e15) supplying a carbon source gas to the furnace for about 5 to 30 minutes and growing the super-aligned array of carbon nanotubes on the substrate.

In step (e11), the substrate can be a P-type silicon wafer, an N-type silicon wafer, or a silicon wafer with a film of silicon dioxide thereon. A 4-inch P-type silicon wafer is used as the substrate.

In step (e12), the catalyst can be made of iron (Fe), cobalt (Co), nickel (Ni), or any alloy thereof.

In step (e14), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can be approximately 200 to 400 micrometers in height, with the super-aligned array including a plurality of carbon nanotubes parallel to each other and approximately perpendicular to the substrate. The carbon nanotubes in the carbon nanotube film can be selected from the group consisting of single-walled carbon nanotubes, double-walled carbon nanotubes, and multi-walled carbon nanotubes. A diameter of each single-walled carbon nanotube approximately ranges from 0.5 to 50 nanometers. A diameter of each double-walled carbon nanotube approximately ranges from 1 to 50 nanometers. A diameter of each multi-walled carbon nanotube approximately ranges from 1.5 to 50 nanometers.

The super-aligned array of carbon nanotubes formed under the above conditions is essentially free of impurities, such as carbonaceous or residual catalyst particles. The carbon nanotubes in the super-aligned array are closely packed together by van der Waals attractive force.

In step (e2), the carbon nanotube segments having a predetermined width can be selected by using an adhesive tape, such as the tool, to contact the super-aligned array. In step (e3), the pulling direction is substantially perpendicular to the growing direction of the super-aligned array of carbon nanotubes and the carbon nanotube segments are pulled at an even/uniform speed.

More specifically, during the pulling process, as the initial carbon nanotube segments are drawn out, other carbon nanotube segments are also drawn out end-to-end due to van der Waals attractive force between ends of adjacent segments. This process of drawing ensures that a continuous and uniform carbon nanotube film having a predetermined width can be formed. The carbon nanotube film includes a plurality of carbon nanotube segments containing a plurality of carbon nanotubes. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has a superior uniformity of thickness and conductivity over a typically disordered carbon nanotube film. Furthermore, the pulling/drawing method is simple, fast, and suitable for industrial applications.

The width of the carbon nanotube film depends on a size of the carbon nanotube array. The length of the carbon nanotube film can be arbitrarily set as desired. In one useful embodiment, when the substrate is a 4-inch P-type silicon wafer, the width of the carbon nanotube film approximately ranges from 0.01 to 10 centimeters, while the thickness of the carbon nanotube film approximately ranges from 0.5 nanometers to 100 micrometers. The carbon nanotubes in the carbon nanotube film can be selected from the group consisting of single-walled carbon nanotubes, double-walled carbon nanotubes, and multi-walled carbon nanotubes. Diameters of the single-walled carbon nanotubes approximately range from 0.5 to 50 nanometers. Diameters of the double-walled carbon nanotubes approximately range from 1 to 50 nanometers. Diameters of the multi-walled carbon nanotubes approximately range from 1.5 to 50 nanometers.

The thickness, area, and shape of the polymer film are arbitrary, and can be selected according to practical needs. In the present embodiment, the thickness of the polymer film approximately ranges from 2 micrometers to 2 millimeters. The materials of the polymer film is selected from the group consisting of polyethylene (PE), polyvinylchloride (PVE), polytetrafluoroethylene (PTFE), polypropylene (PP), polystyrene (PS), polymethyl methacrylate (PMMA), polyethylene terephthalate (PET), polycarbonate (PC), polybutylene (glycol)terephthalate (PBT), polyamide (PA), poly(etherketone) (PEK), polysulfone (PS), polyethersulfone (PES), thermoplastic polyimide (PI), poly(etherimide) (PEI), polyphenylene oxide (PPO), polyphenylene sulfide (PPS), polyvinyl acetate (PVAC), poly(p-phenylene benzobisoxazole) (PBO).

Figure 2:
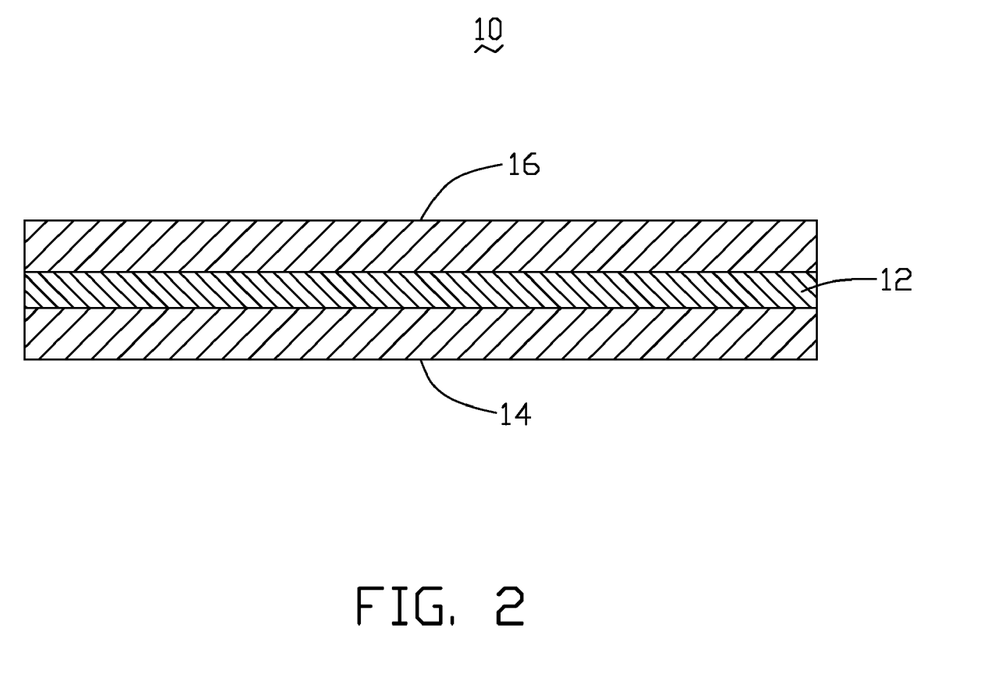
FIG. 2 is a schematic view of the carbon nanotube composite preform formed by the method of FIG. 1.

Referring to FIG. 2, in step (b), the carbon nanotube composite preform 10 can be made by the methods of: laying at least one carbon nanotube film directly on a surface of the first polymer film 14 to obtain the carbon nanotube composite preform 10. Also, the carbon nanotube composite preform 10 can be made by the methods of: stacking several carbon nanotube films to form a self-supporting carbon nanotube film structure 12, and then placing the carbon nanotube film structure 12 on a surface of the first polymer film 14 to obtain the carbon nanotube composite preform 10.

The method of laying at least one carbon nanotube film directly on a surface of the first polymer film 14 to obtain the carbon nanotube composite preform 10 includes the following steps of: (b1) providing a first polymer film 14; (b2) laying at least one carbon nanotube film on a surface of the first polymer film 14; (b3) removing unwanted carbon nanotube film to form a carbon nanotube film structure 12 on a surface of the first polymer film 14, thereby obtaining a carbon nanotube composite preform 10.

In the present embodiment, the carbon nanotube composite preform 10 can be obtained by contactingly placing at least two carbon nanotube films side-by-side and/or stacking at least two carbon nanotube films to form a carbon nanotube film structure 12 on the surface of the first polymer film 14. Coplanar carbon nanotube films located side-by-side form a carbon nanotube layer. Therefore, the carbon nanotube film structure 12 includes one carbon nanotube layer or at least two carbon nanotube layers stacked with one another. The extending direction of the carbon nanotubes in any two adjacent carbon nanotube layers form an angle $\alpha$, and $0 \leq \alpha \leq 90°$. The angle $\alpha$ is 90° in the present embodiment. The angles can also vary between different adjacent pairs of carbon nanotube films.

Furthermore, the second polymer film 16 can be placed on the carbon nanotube film structure 12 to form a carbon nanotube composite preform 10 of sandwich structure as seen in FIG. 2. The sandwich structure could prevent the carbon nanotube in the carbon nanotube film structure 12 from being adhered to the pressing device in following steps. It is to be understood that a multilayer carbon nanotube composite preform 10 can be made via stacking several polymer films and carbon nanotube films structure in turn.

The method of stacking the carbon nanotube films to form a self-supporting carbon nanotube film structure 12, and then placing the carbon nanotube film structure 12 on a surface of the first polymer film 14 to obtain the carbon nanotube composite preform 10 includes the following steps of: (b1') providing a supporter; (b2') attaching at least one carbon nanotube film onto the supporter and removing the unwanted carbon nanotube film; (b3') removing the supporter to obtain the carbon nanotube film structure 12; and (b4') providing at least one first polymer film 14, and stacking the first polymer film 14 and the carbon nanotube film structure 12 to obtain a carbon nanotube composite preform 10.

The supporter can be a substrate or a frame. Because the carbon nanotubes in the super-aligned carbon nanotube array have a high purity and a high specific surface area, the carbon nanotube film is adherent in nature. As such, the carbon nanotube film can be directly adhered to the substrate or frame. The unwanted carbon nanotube film can be cut off via a knife or a laser beam.

Figure 3:
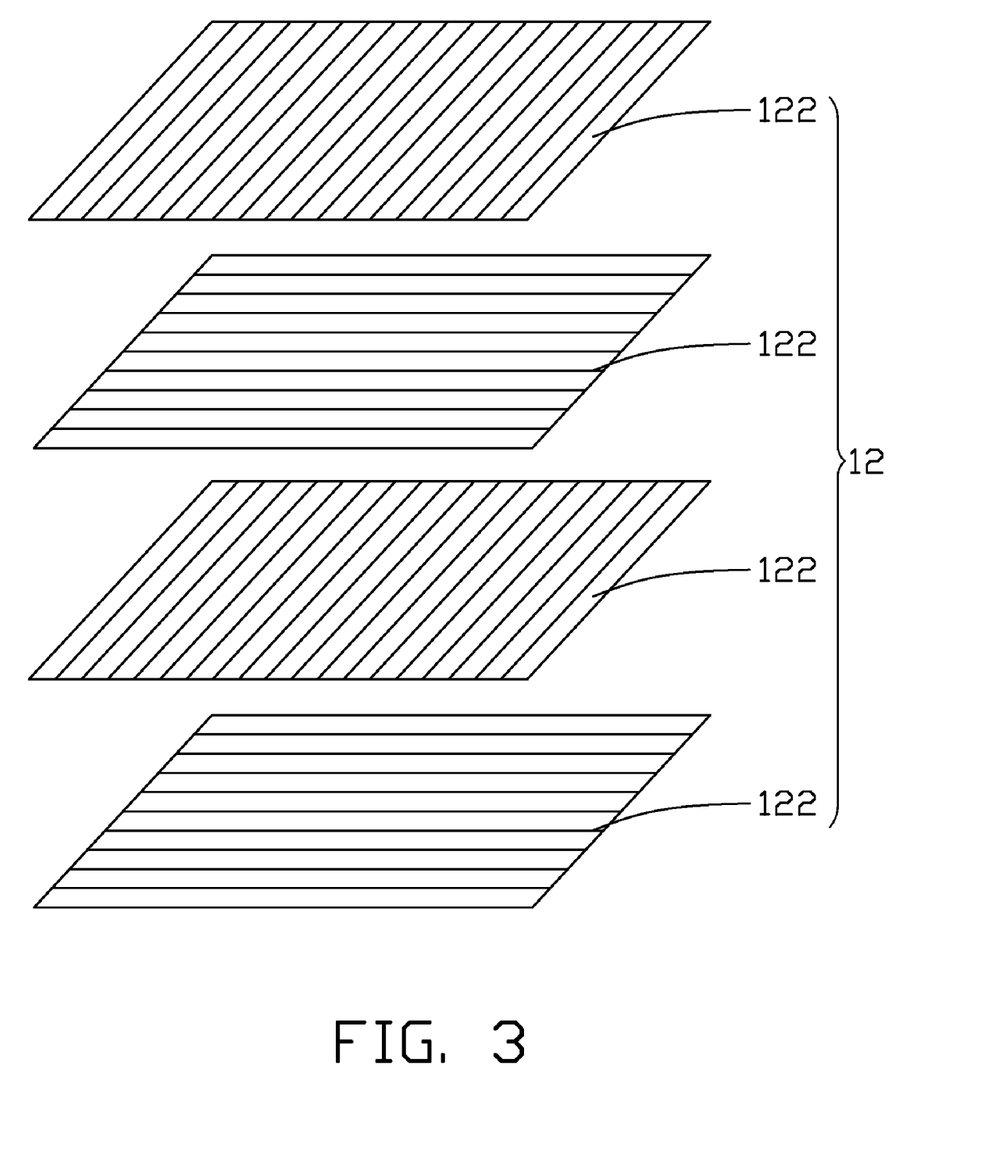
FIG. 3 is a schematic view of a carbon nanotube film structure formed by the method of FIG. 1.

The area and shape of the supporter can be chosen according to user-specific needs. When the width of the supporter is larger than the width of carbon nanotube film, the carbon nanotube film structure 12 can be obtained by contactingly placing at least two carbon nanotube films side-by-side and/or stacking at least two carbon nanotube films on the surface of the supporter. At least two coplanar carbon nanotube films contactingly located side-by-side form a carbon nanotube layer. Therefore, the carbon nanotube film structure 12 can include, one or more stacked carbon nanotube films, one carbon nanotube layer or at least two stacked carbon nanotube layers. The desired size will determine the configuration of the carbon nanotube film structure 12. The extending direction of the carbon nanotubes in any two adjacent carbon nanotube layers form an angle α, and $0 \leq \alpha \leq 90°$. The angle α is 90° in the present embodiment. Referring to FIG. 3, in the present embodiment, the carbon nanotube film structure 12 is made by stacking four carbon nanotube layers 122. The extending direction of the carbon nanotubes in any two adjacent carbon nanotube layers 122 is perpendicular in the present embodiment.

A step of treating the carbon nanotube film structure 12 with an organic solvent can be optionally provided after step (b). The organic solvent is volatilizable and can be selected from the group consisting of ethanol, methanol, acetone, dichloroethane, chloroform, and any appropriate mixture thereof. In the present embodiment, the organic solvent is ethanol. Specifically, the carbon nanotube film structure 12 can be treated by applying organic solvent onto the surface of the carbon nanotube film structure 12 or dipping the entire carbon nanotube film structure 12 in an organic solvent. During the surface treatment, adjacent carbon nanotubes bundle up into numerous successive carbon nanotube strings. The specific surface area and sticky property of the treated carbon nanotube strings is reduced, thereby improving the strength and toughness of the carbon nanotube film structure.

Figure 4:
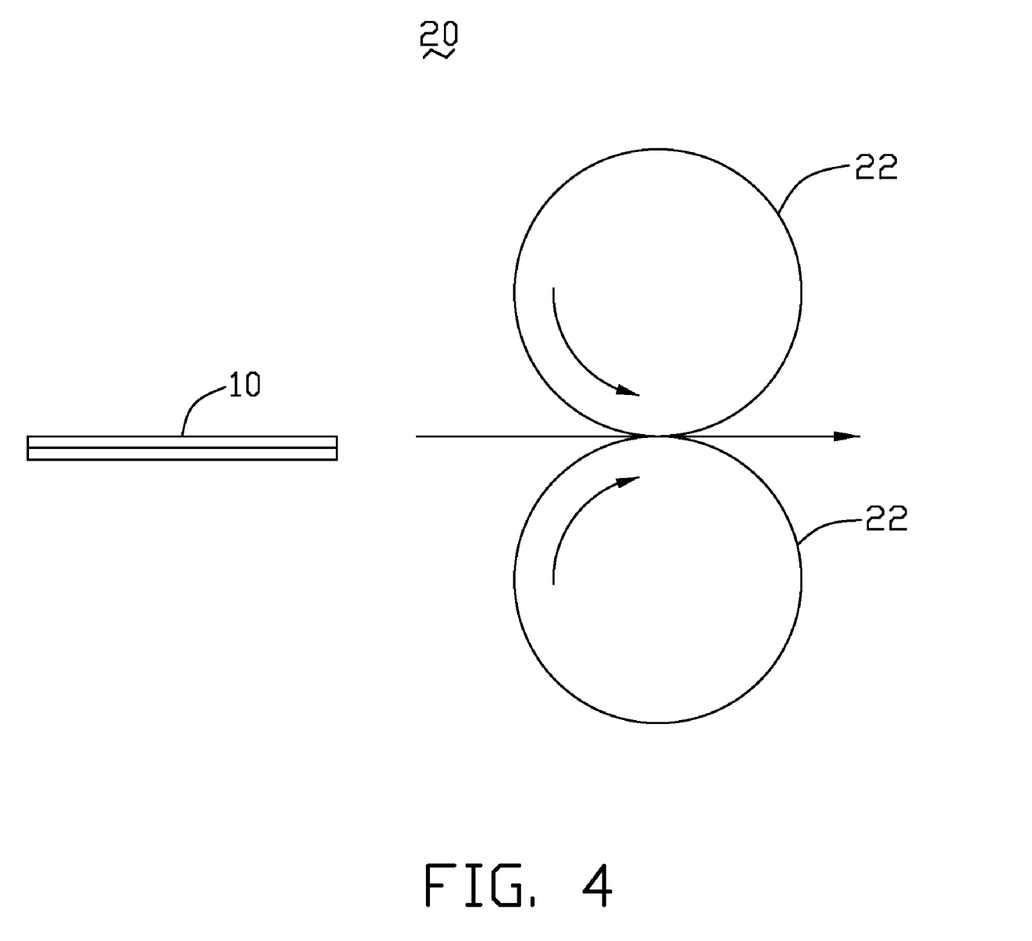
FIG. 4 is a schematic view of an apparatus used for pre-combining the carbon nanotube composite preform of FIG. 1.

Referring to FIG. 4, the step (c) of pre-combining the carbon nanotube composite preform 10 can be carried out via a hot-pressing apparatus selected from the group consisting of double roll device 20, flat hot-pressing shaper, hot press, flat vulcanizer, and oven. The purpose of pre-combining is to evacuate the air in the carbon nanotube composite preform 10 and soften the polymer film. The soft polymer film could connect with the carbon nanotubes in the carbon nanotube film structure 12 closely.

In the present embodiment, the step (c) is carried out via a double roll device 20. The double roll device 20 includes two metal rollers 22 and a heating device. The carbon nanotube composite preform 10 is passed through the hot double roll device 20 slowly with a velocity ranged from approximate 1 millimeter per minute to 10 meters per minute. The temperature of the double roll device 20 is higher than the softening temperature of the polymer film so as to soften the polymer film to connect with the carbon nanotubes in the carbon nanotube film structure 12 closely. Therefore, the temperature of the double roll device 20 varies with the softening temperature of the polymer film. In order to evacuate the air in the carbon nanotube composite preform 10 entirely, the step (c) can be repeated many times. It is to be understood that the process of pre-combining can also be carried out in a vacuum so as to evacuate the air in the carbon nanotube composite preform 10 more effectively.

Figure 5:
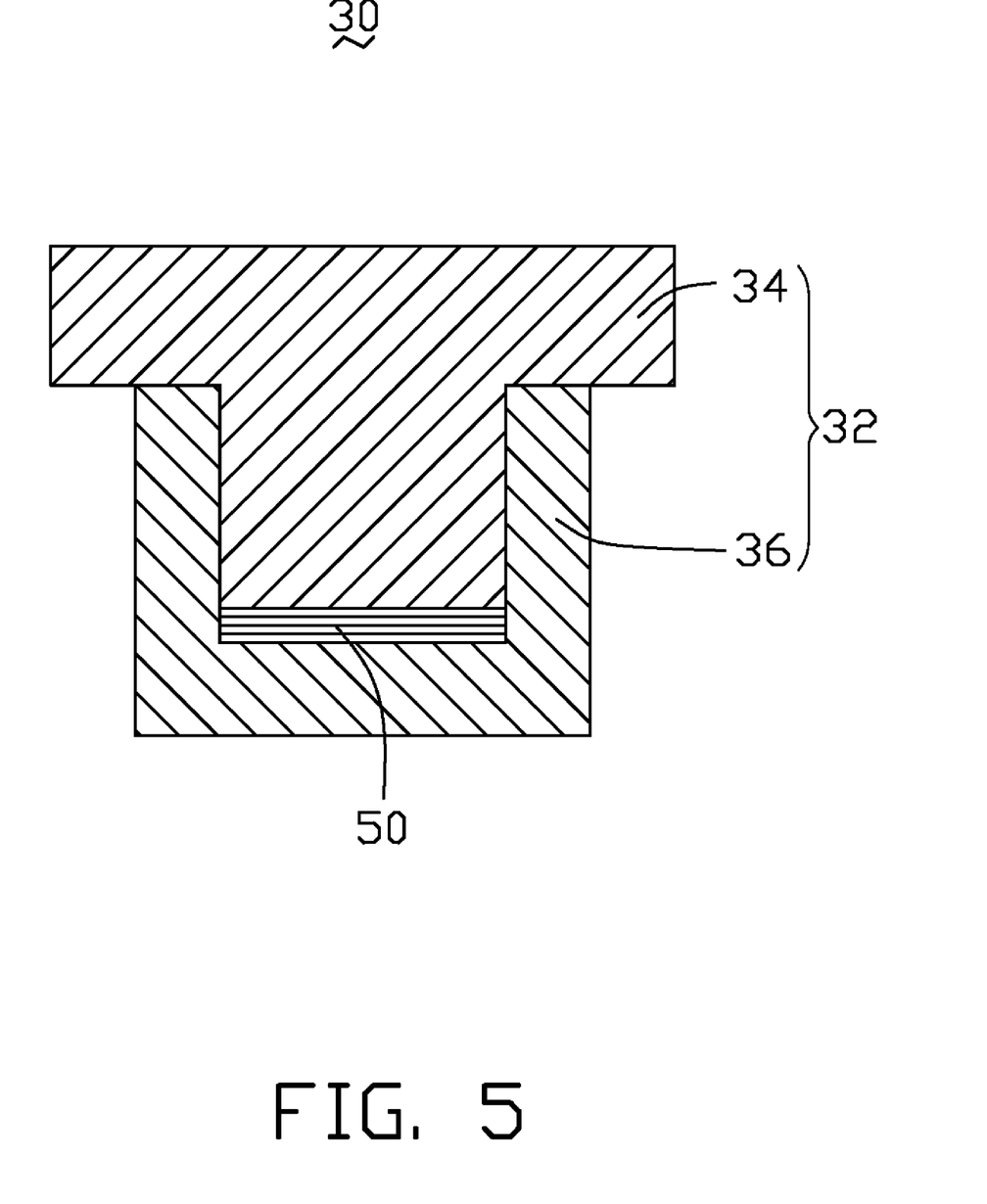
FIG. 5 is a schematic view of an apparatus used for heating and pressing the carbon nanotube composite preform of FIG. 1.

Referring to FIG. 5, in the step (d), the process of heating and pressing the treated carbon nanotube composite preform 50 is carried out via a hot-pressing apparatus. During the step (d), the polymer film becomes molten and infiltrates micropores of the carbon nanotube film structure 12.

The step (d) includes following substeps of: (d1) placing the treated carbon nanotube composite preform 50 into a hot-pressing apparatus; (d2) heating and pressing the treated carbon nanotube composite preform 50 for a pre-determined period of time; and (d3) cooling down and demoulding the treated carbon nanotube composite preform 50 to achieve the carbon nanotube composite.

In the step (d1), the hot-pressing apparatus can be selected from the group consisting of hot press, flat hot-pressing shaper, flat vulcanizer, and oven. Referring to FIG. 5, in the present embodiment, the hot-pressing apparatus is a hot press 30. The hot press 30 includes a pressing device, a heating device and a mold 32. The mold 32 includes an upper male portion 34 and a bottom female portion 36. An optional step of coating releasing agent on an inner surface of mould 32 can be provided before placing the treated carbon nanotube composite preform 50 therein. The releasing agent will facilitate the process of demolding in following step. The materials of the releasing agent various with the materials of the polymer film. The releasing agent can be selected from the group consisting of silicon releasing agent, wax releasing agent, and siloxane releasing agent.

The step (d2) could include the following substeps of: (d21) heating the treated carbon nanotube composite preform 50 up to a temperature above the melting point of the polymer film 14; and (d22) pressing the treated carbon nanotube composite preform 50 for a period of time long enough to melt the polymer film entirely and allow infiltration of the polymer materials into the micropores of the carbon nanotube film structure 12. These steps can be performed individually as well as simultaneously.

The step (d2) could include the following substeps of: (d21') pressing the treated carbon nanotube composite preform 50; and (d22') heating the treated carbon nanotube composite preform 50 up to the melting point of the polymer film for a period of time long enough to melt the polymer film entirely allowing infiltration of the polymer materials into the micropores of the carbon nanotube film structure 12.

The step (d2) can be carried out by heating the treated carbon nanotube composite preform 50 up to the melting point of the polymer film and pressing the treated carbon nanotube composite preform 50 at the same time until the polymer film melts entirely and the polymer materials infiltrate into the micropores of the carbon nanotube film structure 12.

In the step (d2), the heating temperature varies with the melting temperature of the polymer film. The heating temperature is above the melting temperature of the polymer film so as to melt the polymer film entirely and infiltrate the polymer materials into the micropores of the carbon nanotube film structure 12. The pressure is lower than 100 Mpa. The period of time for keeping the pressure on the treated carbon nanotube composite preform 50 is shorter than 2 hours. It is to be understood that several stacked treated carbon nanotube composite preforms 50 can be heated and pressed together.

In the step (d3), the treated carbon nanotube composite preform 50 can be actively or passively cooled. In the present embodiment, the demoulding is carried out at a temperature below 60° C.

Figure 6:
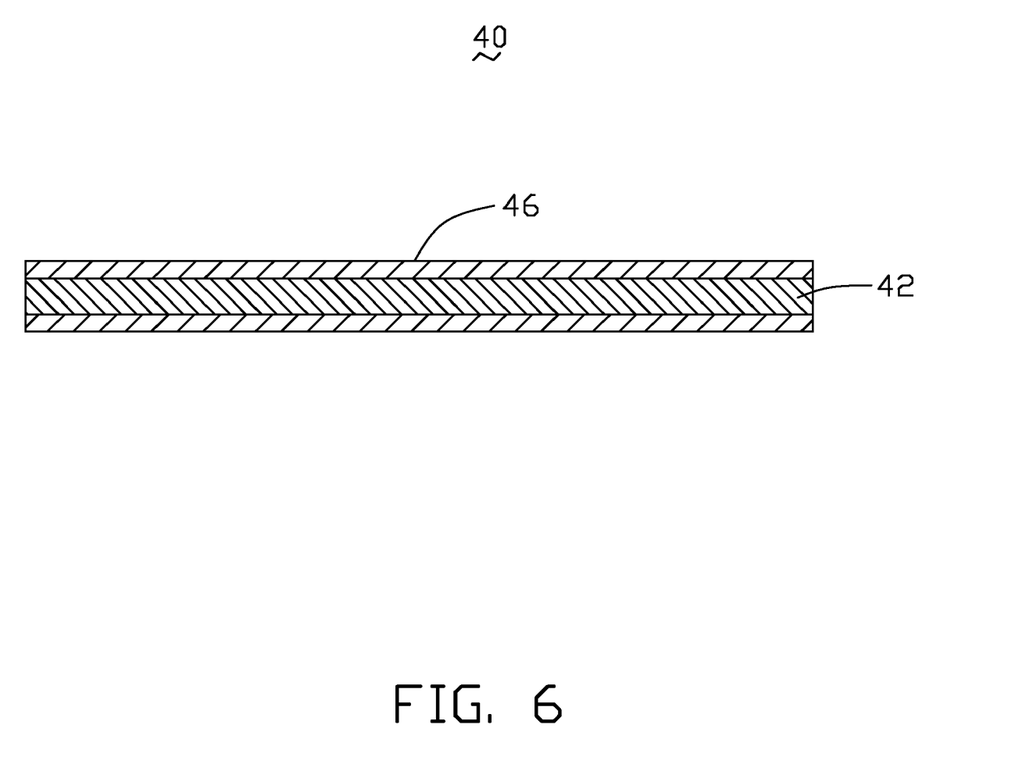
FIG. 6 is a schematic view of the carbon nanotube composite formed by the method of FIG. 1.

Referring to FIG. 6, a carbon nanotube composite 40 is fabricated in the present embodiment. The carbon nanotube composite 40 includes a polymer matrix 46 and a plurality of carbon nanotubes orderly distributed in the polymer matrix 46. The carbon nanotubes distribute in the polymer matrix 46 in form of carbon nanotube film structure 42.

It is also to be understood that the description and the claims may include some indication in reference to certain steps. However, the indication used is applied for identification purposes only, and the identification should not be viewed as a suggestion as to the order of the steps.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a carbon nanotube composite, the method comprising the following steps of:
   (a) providing at least one carbon nanotube film and at least one polymer film;
   (b) forming a carbon nanotube film structure with at least one carbon nanotube film; locating the carbon nanotube film structure on a surface of the at least one polymer film to obtain a carbon nanotube composite preform;
   (c) pre-combining the carbon nanotube composite preform by hot-pressing to obtain a treated carbon nanotube composite preform; and
   (d) heating and pressing the treated carbon nanotube composite preform.

2. The method as claimed in claim 1, further comprising (e) fabricating the at least one carbon nanotube film, wherein fabricating the at least one carbon nanotube film comprises the following substeps of:
   (e1) providing a substrate with an array of carbon nanotubes formed thereon;
   (e2) selecting a plurality of carbon nanotube segments from the array of carbon nanotubes; and
   (e3) pulling the carbon nanotube segments at an even speed.

3. The method as claimed in claim 1, wherein step (b) further comprises placing the at least one carbon nanotube film on a surface of the at least one polymer film directly.

4. The method as claimed in claim 3, wherein at least two carbon nanotube films are placed side-by-side or the at least two carbon nanotube films are stacked.

5. The method as claimed in claim 4, wherein each carbon nanotube film comprises a plurality of carbon nanotubes oriented along the same direction, the orientation of the carbon nanotubes in any two adjacent carbon nanotube films form an angle $\alpha$, and $0 \leq \alpha \leq 90°$.

6. The method as claimed in claim 1, wherein step (b) comprises the following substeps of:
   (b1') providing a supporter;
   (b2') attaching the at least one carbon nanotube film onto the supporter and removing an unwanted carbon nanotube film;
   (b3') removing the supporter to obtain the carbon nanotube film structure; and
   (b4') stacking the at least one polymer film and the carbon nanotube film structure.

7. The method as claimed in claim 6, wherein the step of attaching the at least one carbon nanotube film onto the supporter comprises placing at least two carbon nanotube films side-by-side or stacking the at least two carbon nanotube films on a surface of the supporter.

8. The method as claimed in claim 7, wherein each carbon nanotube film comprises a plurality of carbon nanotubes oriented along the same direction, and the orientation of the carbon nanotubes in any two adjacent stacked carbon nanotube films form an angle $\alpha$, and $0 \leq \alpha \leq 90°$.

9. The method as claimed in claim 1, further comprising a step of treating the carbon nanotube film structure with an organic solvent after the step (b).

10. The method as claimed in claim 9, wherein the step of treating the carbon nanotube film structure with the organic solvent is performed by applying the organic solvent onto a surface of the carbon nanotube film structure or dipping the carbon nanotube film structure in the organic solvent.

11. The method as claimed in claim 1, wherein a thickness of the at least one polymer film approximately ranges from 2 micrometers to 2 millimeters.

12. The method as claimed in claim 1, wherein the step (c) is carried out by a hot-pressing apparatus, and the hot-pressing apparatus is selected from the group consisting of double roll device, flat hot-pressing shaper, hot press, flat vulcanizer, and oven.

13. The method as claimed in claim 1, wherein the step (c) is carried out by passing the carbon nanotube composite preform through a double roll device, and the velocity of passing the carbon nanotube composite preform through the double roll device approximately ranges from 1 millimeter per minute to 10 meters per minute.

14. The method as claimed in claim 13, wherein the step (c) is repeated.

15. The method as claimed in claim 1, wherein the step (c) is carried out at a temperature above a softening temperature of the at least one polymer film.

16. The method as claimed in claim 1, wherein the step (d) comprises the following substeps of:
   (d1) placing the pre-combined carbon nanotube composite preform into a hot-pressing apparatus;
   (d2) heating and pressing the pre-combined carbon nanotube composite preform, and keeping for a period of time; and
   (d3) cooling down and demoulding the carbon nanotube composite preform.

17. The method as claimed in claim 16, wherein the step (d2) comprises the following substeps of: (d21) heating the pre-combined carbon nanotube composite preform up to a temperature above the melting point of the polymer film; and (d22) pressing the carbon nanotube composite preform and keeping for a period of time.

18. The method as claimed in claim 16, wherein the step (d2) comprises the following substeps of: (d21') pressing the carbon nanotube composite preform; and (d22') heating the pre-combined carbon nanotube composite preform up to the melting point of the polymer film.

19. The method as claimed in claim 16, wherein the step (d2) is performed by heating the pre-combined carbon nanotube composite preform up to the melting point of the polymer film and pressing the carbon nanotube composite preform simultaneously.

20. The method as claimed in claim 16, wherein a pressure of pressing the pre-combined carbon nanotube composite preform is lower than 100 Mpa, the period of time of keeping the pressure on the carbon nanotube composite preform is shorter than 2 hours, and the temperature of demoulding is below 60 °C.

* * * * *